3,137,684
PREPARATION OF PHENYL ESTERS VIA ALKOXY-VINYL AND ALKOXYACETYLENE INTERMEDIATES AND USE THEREOF IN PEPTIDE SYNTHESIS
Miklos Bodanszky, Princeton, N.J., assignor to Olin Mathieson Chemical Corporation, New York, N.Y., a corporation of Virginia
No Drawing. Filed May 29, 1962, Ser. No. 198,471
9 Claims. (Cl. 260—112)

This invention relates to a new and improved process for preparing esters and more particularly to an improved process for preparing substituted phenyl esters of amino acids and of peptides.

Prior to this invention it was known that substituted phenyl esters, such as p-nitrophenyl esters, of protected amino acids and peptides are useful intermediates in the synthesis of peptides and more complex peptides. Several methods have been proposed for the preparation of such esters. In accordance with one method, the esters were prepared by reacting an acyl chloride or mixed acid anhydride of the protected amino acid or peptide with the substituted phenol. Other methods involved using the phosphites or sulfites of the substituted phenol as a reactant or carrying out the reaction in the presence of a condensing agent, such as dicyclohexylcarbodiimide.

It has now been found that such esters can be prepared economically and in good yield by reacting the protected amino acid or the protected peptide (or an anhydride of the protected amino acid or protected peptide) with the substituted phenol in the presence of an alkoxyacetylene. The reaction is preferably conducted by dissolving the amino acid and substituted phenol in an organic solvent, such as ethyl acetate, and adding the alkoxyacetylene. If desired, the reaction can be conducted in two steps by first converting the protected amino acid or peptide to an alkoxyethylene ester and then treating this ester with the substituted phenol. In either event the desired substituted phenyl ester of the protected amino acid or peptide is obtained as the product.

By a "protected amino acid" is meant one of the amino acids: alanine, arginine, aspartic acid, citrulline, cysteine, diiodotyrosine, glutamic acid, glycine, histidine, hydroxylysine, hydroxyproline, isoleucine, leucine, lysine, methionine, phenylalanine, proline, serine, threonine, thyroxine, trytophane, tyrosine and valinine, wherein the $\alpha$-amino group has been converted to a protected form, such as by reacting with benzyl chloroformate to yield the N-benzyloxycarbonyl derivative, with phthalic anhydride to yield the N-phthalyl derivative, or with trifluoroacetic acid anhydride to yield the N-trifluoroacetyl derivative. By a "protected peptide" is meant a peptide prepared by combining two or more of the amino acids mentioned above and protecting the free $\alpha$-amino group as described above.

Among the suitable phenols which may be used can be mentioned all phenols substituted by one or more electron attracting substituents, such as nitro, cyano, halo, carbalkoxy and sulfo groups. Among such substituted phenols can be mentioned p-nitrophenol, m-nitrophenol, o-nitrophenol, p-cyanophenol, p-fluorophenol, 2,4-dinitrophenol, 3,5-dinitrophenol, 2,4-dichlorophenol, p-sulfophenol, and p-carbomethoxyphenol.

Among the alkoxyacetylenes can be mentioned the lower alkoxy-acetylenes, as exemplified by methoxyacetylene, ethoxyacetylene, propoxyacetylene, n-butoxyacetylene and n-hexoxyacetylene.

If the reaction is conducted in one step, the amino acid or peptide, substituted phenol and alkoxyacetylene are preferably present in stoichiometric amounts. Optimally, however, to assure completeness of the reaction, the substituted phenol and alkoxyacetylene are both present in excess, preferably at least 1.2 moles of substituted phenol and at least 1.5 moles of alkoxyacetylene being present per mol of amino acid of peptide.

The following examples illustrate the process of this invention, all temperatures being in centigrade:

EXAMPLE 1

*p-Nitrophenyl N-Benzyloxycarbonylglycinate*

Benzyloxycarbonylglycine (2.1 g.) and p-nitrophenol (1.5 g.) are suspended in ethyl acetate (10 ml.) and heated to 50° when solution occurs. Ethoxyacetylene (2 ml.) is added and the mixture is kept at 50° under a reflux condenser for one hour. The solvent and excess reagent are evaporated in vacuo and the crystalline residue is crystallized from hot 95% ethanol containing 1% acetic acid. The product (about 2.64 g.) melts at about 125–127.5°. One more recrystallization raises the M.P. to about 127–128°. The melting point is not depressed by mixing a sample with an authentic sample of p-nitrophenyl benzyloxycarbonylglycinate. The product is insoluble in dilute $NaHCO_3$ solution; it has a characteristic I.R. CO band at $5.65\mu$.

EXAMPLE 2

*p-Nitrophenyl N-Benzyloxycarbonylglycinate*

The same ingredients are used as in Example 1, but the reaction is carried out at room temperature (instead of at 50°) and the reaction time is prolonged to 20 hours. The solvent and excess reagent are removed in vacuo and the crystalline residue washed with 95% ethanol. The yield is about 2.68 g., M.P. about 125–127.5°.

EXAMPLE 3

*p-Nitrophenyl N-Benzyloxycarbonyl-L-Phenylalaninate*

To a solution of p-nitrophenol (1.6 g.) and benzyloxycarbonyl-L-phenylalanine (3.0 g.) in ethyl acetate (10 ml.), ethoxyacetylene (1.3 ml.) is added. The clear solution is kept at room temperature. After about 16 hours the product starts to crystallize. After a total of 24 hours at room temperature hexane (30 ml.) is added, the crystalline product is filtered and washed with hexane (30 ml.) then with absolute ethanol (15 ml.). The active ester (2.8 g., M.P. 123–125°) is obtained practically pure.

In a similar manner, by substituting the N-benzyloxycarbonyl derivatives of any other amino acid for the benzyloxycarbonyl-L-phenylalanine in Example 3, the corresponding p-nitrophenyl esters are formed.

EXAMPLE 4

*p-Cyanophenyl N-Benzyloxycarbonylglycinate*

Following the procedure of Example 1 but substituting an equivalent amount of p-cyanophenol for the p-nitrophenol, the p-cyanophenol ester of N-benzyloxycarbonylglycinate is obtained.

EXAMPLE 5

*p-Nitrophenyl N-Benzyloxycarbonylglycinate*

Following the procedure of Example 1 but substituting 2 ml. of propoxyacetylene for the ethoxyacetylene, the same product is obtained.

EXAMPLE 6

*p-Nitrophenyl N-Benzyloxycarbonyl-L-Propylglycinate*

N-benzyloxycarbonyl-L-propylglycinate (1.53 g.) is dissolved in dimethylformamide (5 ml.) and p-nitrophenol (0.8 g.) is added followed by ethoxyacetylene (1.0 ml.). After 24 hours at room temperature, 50 ml.

of water is added, and the oily precipitate, which solidifies under ether, is collected. After recrystallization from ethanol the M.P. is about 140.5–143.5°.

EXAMPLE 7

*p-Nitrophenyl N-Benzyloxycarbonylglycylglycine*

Starting from N-benzyloxycarbonylglycylglycine, the p-nitrophenyl ester of this protected dipeptide is prepared by the procedure described in Example 6. The product melts at about 164–165°.

The invention may be variously otherwise embodied within the scope of the appended claims.

What is claimed is:

1. A process for preparing a compound selected from the group consisting of a substituted phenyl ester of a protected amino acid and a substituted phenyl ester of a protected peptide, which comprises reacting a compound selected from the group consisting of a protected amino acid and a protected peptide with a phenol containing an electron attracting substituent in the presence of a lower alkoxyacetylene.

2. A process for preparing a compound selected from the group consisting of a substituted phenyl ester of a protected amino acid and a substituted phenyl ester of a protected peptide, which comprises reacting a compound selected from the group consisting of a protected amino acid and a protected peptide with a phenol containing at least one substituent selected from the group consisting of nitro, cyano, halo, carbalkoxy and sulfo, in the presence of a lower alkoxyacetylene.

3. A process for preparing a compound selected from the group consisting of a p-nitrophenyl ester of a protected amino acid and a p-nitrophenyl ester of a protected peptide, which comprises reacting a compound selected from the group consisting of a protected amino acid and a protected peptide with p-nitrophenol in the presence of a lower alkoxyacetylene.

4. A process for preparing a compound selected from the group consisting of a p-nitrophenyl ester of a protected amino acid and a p-nitrophenyl ester of a protected peptide, which comprises reacting a compound selected from the group consisting of a protected amino acid and a protected peptide with p-nitrophenol in the presence of ethoxyacetylene.

5. A process for preparing a p-nitrophenyl ester of a protected glycine, which comprises reacting a protected glycine with p-nitrophenol in the presence of a lower alkoxyacetylene.

6. A process for preparing a p-nitrophenyl ester of N-benzyloxycarbonylglycinate, which comprises reacting N-benzyloxycarbonylglycine with p-nitrophenol in the presence of ethoxyacetylene.

7. A process for preparing a p-nitrophenyl ester of N-benzyloxycarbonyl-L-phenylalaninate, which comprises reacting N-benzyloxycarbonyl - L - phenylalanine with p-nitrophenol in the presence of ethoxyacetylene.

8. A process for preparing a p-nitrophenyl ester of N-benzyloxycarbonyl-L-prolylglycinate, which comprises reacting N-benzyloxycarbonyl-L-prolylglycine with p-nitropheno in the presence of ethoxyacetylene.

9. A process for preparing a compound selected from the group consisting of a substituted phenyl ester of a protected amino acid and a substituted phenyl ester of a protected peptide, which comprises reacting a phenol containing an electron attracting substituent with a compound selected from the group consisting of a 1-(lower alkoxy)vinyl ester of a protected amino acid and a 1-(lower alkoxy)vinyl ester of a protected peptide.

References Cited in the file of this patent

UNITED STATES PATENTS

| 2,793,204 | Arens | May 21, 1957 |
| 3,035,041 | Schwyzer et al. | May 15, 1962 |

OTHER REFERENCES

Chemistry and Industry (September 8, 1962), pages 1620–1621.

Greenstein et al.: Chemistry of the Amino Acids, volume 2 1961), John Wiley and Sons, New York (pages 978–979; 1027–1029; 1038–1039 cited).

UNITED STATES PATENT OFFICE
CERTIFICATE OF CORRECTION

Patent No. 3,137,684                          June 16, 1964

Miklos Bodanszky

It is hereby certified that error appears in the above numbered patent requiring correction and that the said Letters Patent should read as corrected below.

Column 2, line 15, for "crystallized" read -- recrystallized --; column 4, lines 19 and 20, for "p-nitropheno" read -- p-nitrophenol --.

Signed and sealed this 24th day of November 1964.

(SEAL)
Attest:

ERNEST W. SWIDER
Attesting Officer

EDWARD J. BRENNER
Commissioner of Patents